United States Patent [19]

Osborn

[11] 4,282,768

[45] Aug. 11, 1981

[54] VIBRATION ISOLATION MOUNT FOR GEAR SHIFTER

[75] Inventor: Charles Osborn, Spring Lake, Mich.

[73] Assignee: JSJ Corporation, Grand Haven, Mich.

[21] Appl. No.: 42,220

[22] Filed: May 25, 1979

[51] Int. Cl.³ .................. G05G 9/12; G05G 25/00
[52] U.S. Cl. .................................. 74/473 R; 16/2; 74/490; 248/603
[58] Field of Search .......... 74/473 R, 473 P, 473 SW, 74/475, 490, 491; 248/603; 16/2

[56] References Cited

U.S. PATENT DOCUMENTS

| | | | |
|---|---|---|---|
| 1,927,646 | 9/1933 | Miller | 74/473 P |
| 2,312,516 | 3/1943 | Alldredge | 287/85 |
| 2,367,832 | 1/1945 | Riesing | 308/26 |
| 3,039,831 | 6/1962 | Thomas | 308/26 |
| 3,122,941 | 3/1964 | Goldsmith | 74/473 R |
| 3,364,778 | 1/1968 | Griffen et al. | 74/473 R |
| 3,406,586 | 10/1968 | Hobbins | 74/473 R |
| 3,657,943 | 4/1972 | Bruhn, Jr. et al. | 74/473 R X |
| 3,687,404 | 8/1972 | Werner | 248/7 |
| 3,757,884 | 9/1973 | Tomita et al. | 74/490 X |
| 3,762,747 | 10/1973 | Griffen | 74/490 X |
| 3,774,469 | 11/1973 | Bruhn, Jr. | 74/476 |
| 3,830,595 | 8/1974 | Carpenter et al. | 248/603 |
| 3,895,408 | 7/1975 | Leingang | 16/2 |
| 3,899,934 | 8/1975 | Froumajou | 74/473 R X |
| 4,062,637 | 12/1977 | Allison | 403/151 |
| 4,077,655 | 3/1978 | Skahill | 280/756 |

FOREIGN PATENT DOCUMENTS 2353417 10/1973 Fed. Rep. of Germany ........ 74/473 R

OTHER PUBLICATIONS

Marks' Standard Handbook for Mechanical Engineers, 7th edition, 1967, pp. 5-90 through 5-95.

*Primary Examiner*—Allan D. Herrmann
*Attorney, Agent, or Firm*—Price, Heneveld, Huizenga & Cooper

[57] ABSTRACT

In an automotive transmission shifter of the type mounted directly on the side of an automotive transmission and having a shift stick extending into the vehicle passenger compartment, vibration isolation means disposed between the transmission and the shifter. The shifter includes a plurality of mounting posts formed from the ends of side plate clamping bolts and a carrier pivot shaft bolt. A plurality of elastomer grommets are disposed in an apertured mounting plate adapted to be rigidly mounted to the side of the transmission. The mounting posts are then inserted in the elastomer grommets to suspend the shifter from the side of the transmission.

21 Claims, 4 Drawing Figures

VIBRATION ISOLATION MOUNT FOR GEAR SHIFTER

BACKGROUND OF THE INVENTION

The invention relates to a gear shifting mechanism of the type which includes a shift stick extending into the passenger compartment of the vehicle for manual operation by the driver. More particularly, the invention relates to an arrangement for preventing vibration generated in the engine and drive train from being transmitted to the passenger compartment through the shift stick.

Experience has shown that one source of noise in cars having stick shift transmissions is the conduction of noise and vibration from the transmission and engine through the shifting mechanism and the shift stick into the passenger compartment of the vehicle. The noise and vibration thus transmitted may cause the shift stick to vibrate, to generate an audible hum, or both.

In the prior art, stick shifters were provided with a socket or the like, for receiving the shift stick, the socket having a sound insulating lining for isolating the shift stick from the vehicle drive train. However, mounting the shifter stick or handle in an elastomer vibration isolation material results in a shifting mechanism having a poor feel. Also, since the mass of the suspended stick shift is quite low, the natural frequency of the shift stick is relatively high. This is undesirable since it is known that the natural frequency of a supported structure must be small in comparison to the frequency of the disturbing force for the isolator to perform its function, substantially reducing the transmissibility of the disturbing force to the supported structure. The expense of providing a socket lined with a vibration isolating material also renders this an undesirable arrangement for isolating the stick shift from drive train vibration.

Elastomer bushings have been used in prior art for interconnecting two relatively movable parts without transmitting vibration from one part to another. For example, such bushings are found in automotive transmission and steering linkages. Such bushings have also been used as engine mounts for isolating engine vibration from a vehicle body and as shock mounts for various structures mounted on a vehicle.

SUMMARY OF THE INVENTION

According to the invention; in an automotive transmission shifter of the type mounted directly on the side of an automotive transmission and including a shift stick extending into a vehicle passenger compartment, sound and vibration isolation means is provided, the sound and vibration isolation means being disposed between the transmission and the shifter. According to more narrow aspects of the invention, the shifter is provided with a plurality of mounting posts and vibration insulating grommets. The grommets and the mounting posts are received in an apertured mounting plate rigidly secured to the transmission. At least three widely spaced mounting posts and grommets are employed to provide a three-point connection between the transmission and the shifter that provides a firm mount for the shifter, insuring smooth operation and a good feel. Metal to metal contact between the shifter and the source of drive train vibration is prevented by this inexpensive vibration isolation arrangement. Also, since the entire shifter is suspended by the vibration isolation means the suspended mass is larger, further reducing the transmissibility.

BRIEF DESCRIPTION OF THE DRAWINGS

FIG. 2(a) is a schematic representation of a suspended vibration isolated structure having one degree of freedom in the X direction.

DESCRIPTION OF THE PREFERRED EMBODIMENTS

Figure 1:
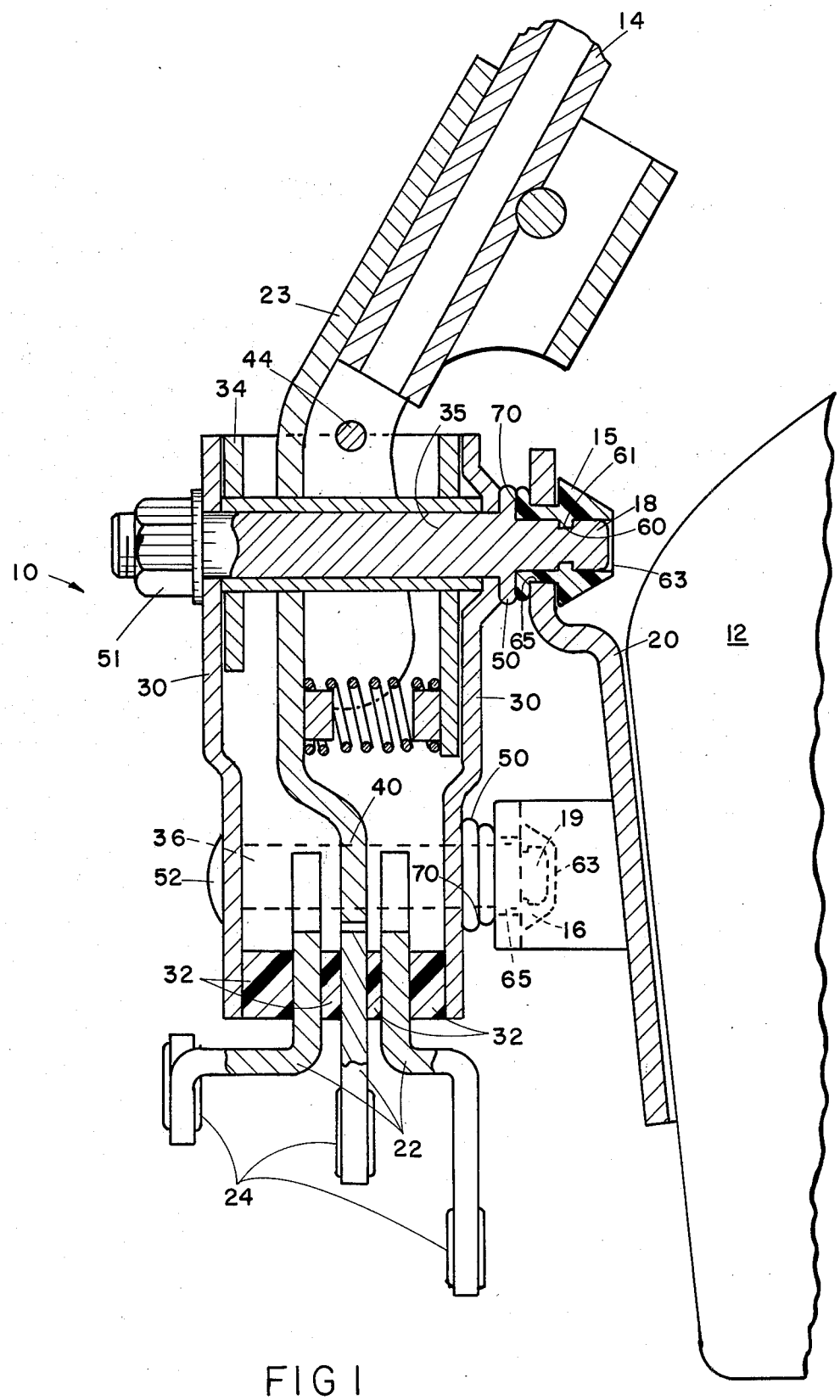
FIG. 1 is a rear elevational view, partially in section, of an automotive transmission shifter constructed according to the present invention.

Referring to FIG. 1, an automotive transmission shifter 10 is illustrated, the shifter 10 being of the type mounted directly on an automotive transmission generally indicated by the numeral 12. The shifter 10 further includes a shifter stick 14, not fully illustrated herein, which extends into the vehicle passenger compartment. Vibration and noise generated in the motor and drive train and transmitted to the shifter 10, by the transmission 12 is isolated from the passenger compartment by vibration isolation means comprising a plurality of sound or vibration insulating grommets illustrated at 15 and 16 in FIG. 1. The grommets 15 and 16 are disposed between the transmission 12 and the shifter 10. The shifter 10 includes a plurality of mounting posts, illustrated at 18 and 19 in FIG. 1. The mounting posts 18 and 19 are inserted in grommets 15 and 16, respectively. The posts and grommets are received in an apertured mounting plate 20 which is rigidly secured to the side of the transmission 12. The shifter 10 is also indirectly connected to the transmission 12 through a plurality of gear actuators 22 which are connected to the transmission shift levers, not illustrated herein. Vibration insulating bushings 24 insulate the gear actuators 22 from drive train vibration. The operator employs the shift stick 14 to pivot a gear selector 23 for selectively engaging and displacing the gear actuator 22.

Figure 2:
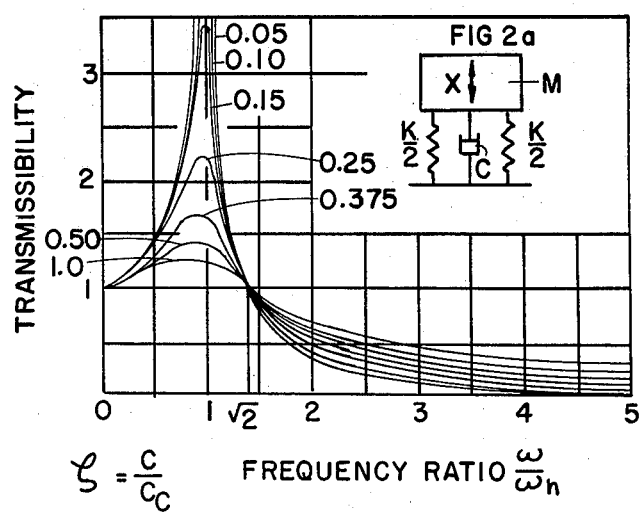
FIG. 2 is a plot of transmissibility versus the ratio of the disturbing frequency to the natural frequency of a suspended structure.

For a vibration isolator to function well the natural frequency $\omega_n$ of the supported structure must be small in comparison to the frequency $\omega$ of the disturbing force. The undamped natural frequency of a suspended structure is equal to:

$$\omega_n = \sqrt{\frac{kg}{M}} \tag{1}$$

Where k is the spring constant of the elastomer or spring material suspending the structure; g is the acceleration due to gravity; and M is the mass of the object. Equation (1) illustrates that as the mass increases, the natural frequency of the suspended system decreases. Of interest here is the ratio of the force transmitted to the suspended structure to the disturbing force. This ratio is traditionally referred to as transmissability and is plotted in FIG. 2 for the single degree of freedom spring/mass system schematically illustrated in FIG. 2(a). In FIG. 2(a) the mass M is suspended by a suspension having a damping C and a spring constant k. The damping factor $\zeta$ is equal to $C/C_c$ where $C_c$ is the critical damping value for the spring/mass system. FIG. 2 plots the transmissability versus the frequency ratio $\omega/\omega_n$ for values of $\zeta$ in a range of 0.05 to 1.0 where a sinusoidal excitation frequency is applied to the spring/mass system of FIG. 2(a). See pages 5-90 through 5-105 of *Mark's Standard Handbook for Mechanical Engineers*, Seventh Edition, 1967, hereby incorporated by reference, for further development of the mathematical model from which the curves plotted in FIG. 2 are drawn. FIG. 2 is presented here to illustrate that whenever the ratio of the frequency of the disturbing force $\omega$ to the natural frequency of the suspended mass $\omega_n$ is high the transmissibility is lowest for values of $\zeta$ greater than one. Thus, increasing the mass of the suspended structure decreases its natural frequency $\omega_n$, Equation (1), increases the frequency ratio $\omega/\omega_n$ and lowers the transmissibility, FIG. 2.

According to the present invention, the transmissibility of the suspended structure is reduced by placing the vibration isolation means between the shifter 10 and the transmission 12, rather than between the shift stick 14 and the shifter 10. This effectively increases the mass of the supported structure to the combined mass of the shift stick 14 and shifter 10 producing a reduction in the amount of noise and vibration transmitted into the vehicle passenger compartment. Yet, by using a plurality of grommets to provide a widely spaced three-point connection, best illustrated in FIG. 3, a shifter with a much more firm and improved feel is provided.

Referring to FIG. 1, in the case where the shifter 10 is a type of shifter including a pair of side plates 30 with a plurality of displaceable gear actuators 22, a plurality of spacer plates 32 and a pivotable carrier 34 clamped therebetween, the posts 18 and 19 are preferably formed from the ends of a carrier pivot shaft bolt 35 and a pair of side plate clamping bolts, one of which is illustrated at 36 in FIG. 1. It is to be understood, however, that one or more of the mounting posts may comprise a headed pin welded or otherwise suitably secured to the side of the shifter. The carrier 34 is pivotable about the carrier pivot shaft bolt 35 so that engaging means 40 disposed on the selector 23, and alternately engaging slots in the gear actuators 22, linearly displaces one of the gear actuators 22 when the operator pivots the shift stick 14 about the carrier pivot shaft bolt 35. The shift stick 14 is also pivotable about a pin 44 in carrier 34 so that the engaging means 40 may be selectively moved between gear actuators 22 by pivoting the shift stick 14 about the pin 44. The design and operation of such an automotive gear shifter is described in further detail in U.S. Pat. No. 3,774,469 issued to Bruhn, Jr., and assigned to the same assignee. The disclosure of the aforesaid patent is hereby incorporated by reference.

Figure 3:
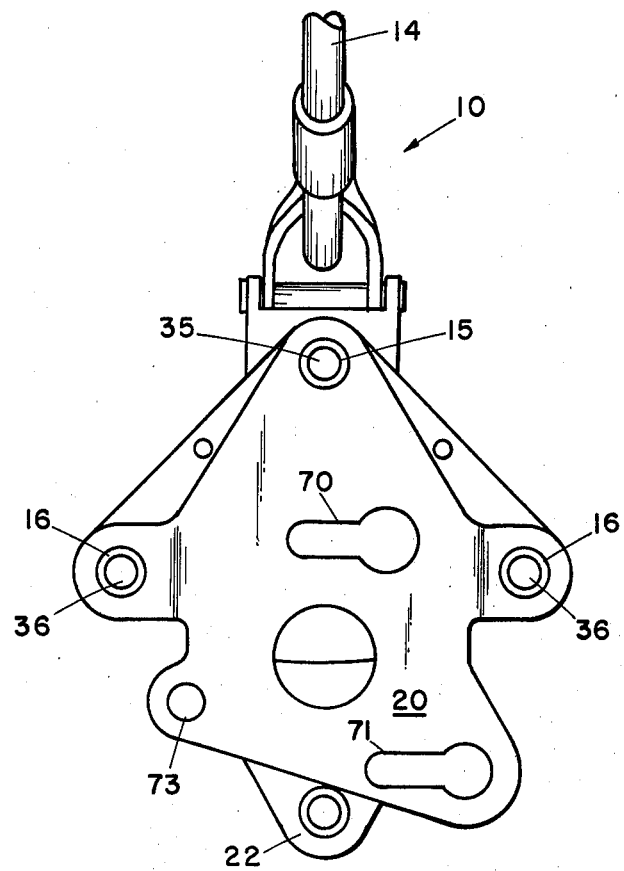
FIG. 3 is a side elevational view of an automotive transmission shifter constructed according to the present invention.

Referring briefly to FIG. 3, it is illustrated that the carrier pivot shaft bolt 35 and two side plate clamping bolts 36 are inserted in grommets 15 and 16, respectively, to provide a widely spaced three-point connection to the transmission 12. The carrier pivot shaft bolt 35 and grommet 15 form one high mounting post and the side plate clamping bolts 36 and grommets 16 form two low mounting posts. Referring now to FIG. 1, it is illustrated that both the carrier pivot shaft bolt 35 and the side plate clamping bolts 36 are cold headed or otherwise suitably formed with flanges 50. In the assembly of the shifter 10, the ends of the bolts 35 and 36 opposite the flanges 50, are inserted through the side plates 30 and the side plates 30 are clamped therebetween by a nut, such as the one illustrated at 51, on carrier pivot shaft bolt 35; and allen head screws, such as the one illustrated at 52, received in the side plate clamping bolts 36.

The mounting posts 18 and 19 extending from the transmission side of the bolts 35 and 36, respectively, further include a first circumferential groove 60. Each grommet 15 and 16 includes an internal flange 61 which is received in the first circumferential groove 60 to secure the grommet to each mounting post. The internal flange 61 is disposed in a central bore of the grommet into which each of the posts is inserted. The grommets 15 and 16 further include a generally frusto-conical head 63 to facilitate insertion of the grommet into the apertured mounting plate 20. Generally, the grommets are first inserted in the apertured mounting plate 20 and then the mounting posts are inserted therein by urging the mounting posts into the grommets until the rear surface 70 of each grommet abuts flange 50 on each mounting post. The bodies of the grommets 15 and 16 further include a second circumferential groove 65 axially displaced from the first circumferential groove 60 and disposed behind the frusto-conical heads 61 of the grommet. The second circumferential groove 65 receives the edges of apertures in mounting plate 20 to secure the grommets therein once the frusto-conical heads 61 of the grommets are forced through apertures in apertured mounting plate 20. Withdrawal of the assembly is prevented since compression of the frusto-conical heads during withdrawal cams. the internal flanges 61 of each grommet deeper into the first circumferential groove 60, insuring that the grommet remains fixed on the mounting post. A suitable material for forming the vibration insulating grommets of the present invention has been found to be the polymer commonly referred to as urethane. However, other polymeric or elastomeric materials may be found suitable by those skilled in the art.

Referring to FIG. 3, preferably the apertured mounting plate 20 includes a bolt pattern including three apertures 70, 71 and 73. Generally, the shifter 10 and mounting plate 20 are factory assembled and shipped as a unit to an automotive assembly plant where attachment of the shifter to the transmission along with the vibration isolation means disposed therebetween becomes a simple matter of bolting the apertured mounting plate to the side of the transmission. Keyway shaped apertures, such as the apertures 70 and 71 may be provided when it is not possible to torque the mounting bolts with a socket type driver. In this case the bolts are mounted on the transmission and the heads are inserted in the apertured mounting plate through keyways 70 and 71. An open end or box-type driver is then used to tighten the bolts.

The above description should be considered as exemplary and that of the preferred embodiment only. The true spirit and scope of the present invention should be determined by reference to the appended claims. It is desired to include within the appended claims all modifications that come within the proper scope of the invention.

The embodiments of the invention in which an exclusive property or privilege is claimed are defined as follows.

1. In an automotive transmission shifter of the type mounted directly on an automotive transmission and including a shift stick extending into a vehicle passenger compartment, said shifter comprising a plurality of displaceable gear actuators and a plurality of spacer plates sandwiched between a pair of side plates, said side plates being bolted together by at least one bolt, the improvement comprising sound and vibration isolation means disposed between the transmission and said shifter comprising:

- a plurality of sound and vibration isolating grommets for providing a widely spaced three-point connection between the transmission and said shifter; and
- at least one post for mounting one of said grommets disposed on the end of said at least one bolt.

2. The automotive transmission shifter of claim 1 wherein said shifter comprises a pivotable carrier for actuating at least one displaceable gear actuator, and a carrier pivot shaft bolt, said pivot shaft bolt providing a post for mounting one of said grommets.

3. In an automotive transmission shifter of the type mounted directly on an automotive transmission, and including a shift stick extending into a vehicle passenger compartment, the improvement comprising sound and vibration isolation means disposed between the transmission and said shifter comprising:

- at least one vibration isolating grommet disposed between the transmission and said shifter;
- at least one mounting post disposed on said shifter said grommet encompassing said mounting post;
- said mounting post being provided with a first circumferential groove; and
- said grommet being provided with an internal flange received in said first circumferential groove to secure said grommet to said mounting post.

4. The automotive transmission shifter of claim 3 wherein said grommet comprises a member having a central bore for receiving said mounting post, said central bore including said internal flange, a frusto-conical head to facilitate insertion of said grommet in a mounting aperture and a second circumferential groove for receiving the edges of said mounting aperture and securing said grommet therein.

5. The automotive transmission shifter of claim 4 wherein said first and second circumferential grooves are axially displaced, said first circumferential groove being disposed under said frusto-conical head such that said internal flange is cammed into said first circumferential groove when said grommet and said mounting post are urged through said mounting aperture, said second circumferential groove being disposed axially behind said frusto-conical head.

6. The automotive transmission shifter of claim 5 wherein said mounting post is provided with an external flange abutting said grommet.

7. The automotive transmission shifter of claim 6 wherein said grommet is formed of urethane.

8. In an automotive transmission shifter of the type mounted directly on an automotive transmission, and including a shift stick extending into a vehicle passenger compartment, the improvement comprising sound and vibration isolation means disposed between the transmission and said shifter comprising:

- a mounting plate secured to the transmission;
- a plurality of apertures disposed in said mounting plate;
- a plurality of widely spaced mounting posts projecting from said shifter;
- a plurality of elastomeric vibration isolating grommets, one of said grommets being disposed on each of said mounting posts;
- each of said grommets being sufficiently deformable to permit insertion of said grommets and said posts in said apertures; and
- each of said grommets further comprising shoulder means for gripping the periphery of said apertures and preventing withdrawal of said grommets and said posts from said apertures, whereby a push-in combination vibration isolating and fastening arrangement for an automotive transmission shifter is provided.

9. The automotive transmission shifter of claim 8 wherein three of said grommets are used to provide a widely spaced three-point connection between the transmission and said shifter.

10. The automotive transmission shifter of claim 9 wherein said shifter is provided with one high post and two low posts.

11. The automotive transmission shifter of claim 10 wherein said shifter comprises a plurality of displaceable gear actuators, a plurality of spacer plates sandwiched between a pair of side plates, and a pivotable carrier for actuating said gear actuators, said high post comprising a carrier pivot shaft bolt and said two low posts comprising a pair of side plate bolts interconnecting said side plates.

12. The automotive transmission shifter of claim 8 wherein said shifter comprises a plurality of displaceable gear actuators and a plurality of spacer plates sandwiched between a pair of side plates, said side plates being bolted together by at least one bolt, the end of said at least one bolt providing one of said posts for mounting one of said elastomer grommets.

13. The automotive transmission shifter of claim 8 wherein said shifter comprises a pivotable carrier for actuating at least one displaceable gear actuator, and a carrier pivot shaft bolt, the end of said pivot shaft bolt providing one of said posts for mounting one of said elastomer grommets.

14. The automotive transmission shifter of claim 8 wherein each of said grommets comprise a member having a central bore for receiving one mounting post, said member including a frusto-conical head to facilitate insertion of said member in one of said apertures and a circumferential groove defining said shoulder means for engaging the periphery of one of said apertures and securing one of said grommets therein.

15. The automotive transmission shifter of claim 14 wherein said grommets are formed of urethane.

16. The automotive transmission shifter of claim 8 wherein each of said mounting posts is provided with a first circumferential groove and each of said grommets is provided with an internal flange received in said first circumferential groove to secure each of said grommets to one of said mounting posts.

17. The automotive transmission shifter of claim 16 wherein each of said grommets comprise a member having a central bore for receiving one of said mounting posts, said central bore including said internal flange, a frusto-conical head to facilitate insertion of each of said grommets in one of said apertures and a second circumferential groove defining said shoulder means for gripping the periphery of said apertures and securing one of said grommets therein.

18. The automotive transmission shifter of claim 17 wherein said first and second circumferential grooves are axially displaced, said first circumferential groove being disposed under said frusto-conical head such that said internal flange is cammed into said first circumferential groove when said grommet and said mounting post are urged through said mounting aperture, said second circumferential groove being disposed axially behind said frusto-conical head.

19. The automotive transmission shifter of claim 18 wherein each of said mounting posts is provided with an external flange abutting each of said grommets.

20. The automotive transmission shifter of claim 18 wherein each of said grommets is formed of urethane.

21. An automotive transmission shifter of the type mounted directly on an automotive transmission and including a shift stick extending into a vehicle passenger compartment the combination comprising:
   a pair of side plates;
   a plurality of displaceable transmission gear actuator members;
   a plurality of spacer plates;
   a pair of side plates, said actuator members and said spacer plates being sandwiched therebetween;
   a plurality of side plate bolts clamping said side plates together;
   a pivotable carrier for actuating said actuator members;
   a carrier pivot shaft bolt;
   the ends of said carrier pivot shaft bolt and at least two of said side plate bolts being provided with mounting posts;
   a plurality of vibration isolation grommets; each of said grommets being disposed on one of said mounting posts;
   an apertured mounting plate adapted to be secured to the transmission;
   a plurality of mounting apertures disposed in said mounting plate, said grommets being inserted therein for mounting said shifter to the transmission.

* * * * *